United States Patent [19]
Kubota et al.

[11] 3,873,729
[45] Mar. 25, 1975

[54] PREPARATION OF A CHEESE-LIKE FERMENTED FOOD

[75] Inventors: Hayato Kubota; Teizaburo Tateishi, both of Osaka, Japan

[73] Assignee: Fuji Oil Company, Limited, Osaka, Japan

[22] Filed: Sept. 5, 1973

[21] Appl. No.: 394,457

Related U.S. Application Data
[63] Continuation of Ser. No. 198,473, Nov. 12, 1971, abandoned.

[30] Foreign Application Priority Data
Nov. 17, 1970 Japan............................... 45-100694
Apr. 2, 1971 Japan............................... 46-19668

[52] U.S. Cl...................... 426/40, 426/36, 426/362
[51] Int. Cl.............................................. A23c 19/02
[58] Field of Search ............ 426/188, 189, 361, 36, 426/194, 202, 40, 362

[56] References Cited
UNITED STATES PATENTS

| | | | |
|---|---|---|---|
| 2,859,119 | 11/1958 | Cochran et al. ..................... | 426/194 |
| 2,892,721 | 6/1959 | Nelson................................. | 426/194 |
| 2,914,546 | 11/1959 | Barsky et al. .................... | 426/202 X |
| 3,278,313 | 10/1966 | Rhodes................................ | 426/33 |

*Primary Examiner*—David M. Naff
*Attorney, Agent, or Firm*—Craig & Antonelli

[57] ABSTRACT

An artifical cheese-like food is prepared using as the source of fat an interesterified synthetic fat which has no $C_4$ fatty acid component and which contains 1 to 20 percent caproic acid, 0.5 to 10 percent caprylic acid, 0.5 to 10 percent capric acid and 0.5 to 10 percent lauric acid. The cheese food is prepared by mixing the synthetic fat with milk solids to form an emulsion and fermenting the emulsion with a starter followed further by conventional cheese-making procedures.

12 Claims, No Drawings

PREPARATION OF A CHEESE-LIKE FERMENTED FOOD

This is a continuation of application Ser. No. 198,473, filed on Nov. 12, 1971, which application is now abandoned.

FIELD OF THE INVENTION

This invention relates to a cheese-like fermented food and a process for producing the same, which comprises using a synthetic oil and fat (hereinafter referred to merely as a synthetic fat) into which caproic acid radicals combined with or not combined with other fatty acid radicals are incorporated. More particularly, this invention relates to a process for producing a cheese-like food according to conventional cheese-making procedures by the use of an oil-in-water type emulsion formed by blending a synthetic fat, refined after interesterification of a caproic acid ester with at least one of natural oils and fats, and an aqueous solution containing milk solids.

BACKGROUND OF THE INVENTION

Heretofore, all cheese-like foods, which resemble natural cheese but are distinguished therefrom since they contain components other than milk, have been based on natural cheese. That is, the cheese-like flavor of the cheese-like foods of prior art depend entirely on that of natural cheese. The preparation method of the prior art comprises mixing various oils and fats, milk solids or the like with natural cheese. Accordingly, the production is always influenced by the supply demand relations of milk as the basic material. This kind of industrial instability in the supply of raw materials has become a serious problem in production control. In addition, as the result of mixing of various oils and fats, milk solids or the like with natural cheese in the production procedure, the product is necessarily lacking in flavor. Moreover, in the case of natural cheese, further fermentation of more preferable flavor may possibly be expected by means of ageing. But no such fermentation of flavor of natural cheese by means of aging may be expected in the above process, since said process requires heating in the step of admixing of various oils and fats, milk solids, or the like.

Natural cheese is made from milk, wherein the oil and fat contained is milk fat. Hence, it will be apparent to those skilled in the art to use an oil and fat similar to milk fat in order to produce a cheese-like food by using an oil and fat other than milk fat. However, in spite of many attempts, there has never been established such an oil and fat system as capable of brewing a flavor of natural cheese by fermentation. In order to produce a fat which resembles milk fat, it has been proposed to make the physical properties of a fat such as organoleptic property or melting property approximate those of milk fat. One of such proposals is to mix an animal fat such as lard or tallow with a vegetable oil such as coconut oil, palmkernel oil or the like. Another method is to adjust melting point by mixing hydrogenated vegetable oils or fish oils with each other. Further method is to effect interesterification between lard or tallow and coconut oil. However, by such a mere approximation of physical properties to those of milk fat, brewing of flavor by fermentation was impossible for the milk wherein the milk fat was displaced with this kind of fat. Brewing of flavor is impossible even if the chemical composition of a fat is approximated to that of milk fat. For example, a fat having a Reichert Meissel Value, an Iodine Value, a Saponification Value and the like similar to those of a milk fat may be produced by blending with triglyceride. But, even by the use of such a fat which extremely resembled milk fat, no brewing of flavor was possible. In the blending method just mentioned, the glycerides of lower fatty acids themselves have very sharp bitterness and not suitable for foods. In addition, only an unfavorable and unbalanced odor is produced in the fermentation process therefor. If deodorization treatment is applied by way of reduced steam distillation for the purpose of eliminating such bitterness, the triglycerides of lower fatty acids are also volatilized, so that flavor brewing is no more possible.

The present invention provides a new fat system capable of brewing flavor by fermentation which is obtained by effecting interesterification between a caproic acid ($C_6$) ester or an ester mixture of $C_6$, $C_8$, $C_{10}$, and $C_{12}$ fatty acids and natural animal and/or vegetable oils and fats. Although the triglyceride composition of this fat system is entirely different from that of milk fat since the fatty acid radicals are randomly redistributed therein, various types of flavor may optionally be brewed by compounding $C_6$, $C_8$, $C_{10}$ and $C_{12}$ fatty acids at suitable ratios. The fat system according to the present invention is characteristic in that $C_4$ fatty acid is absent and in that the triglyceride is entirely different from that of milk fat. Thus, the present invention provides a new method for brewing flavor by fermentation by using an oil and fat other than milk fat.

According to the present invention, there is provided a novel process for producing cheese-like foods resembling natural cheese by using milk solids (including defatted milk solids) and synthetic fats both of which may constantly be supplied. According to the process of the present invention, the brewing of flavor by means of aging may freely be controlled. The present invention makes it possible to produce cheese-like foods resembling natural cheese cheaply and stably. Furthermore, as mentioned above, brewing of new flavor not found in the prior art is rendered possible by varying the composition of the synthetic fats to be used. Thus, the present invention contributes much, economically, technically and industrially to the art of producing cheese-like foods.

SUMMARY OF THE INVENTION

In the present invention, an ester of caproic acid or a mixture of caproic acid ester together with esters of caprylic acid, capric acid and/or lauric acid, is allowed to react with natural animal and/or vegetable oils and fats and/or hardened oils thereof for interesterification to obtain a synthetic fat. A conventional catalyst such as sodium methylate may preferably be used in said interesterification. The synthetic fat thus obtained is subjected to refining ("refining" herein used includes deacidification, bleaching and deodorizing which are required for producing an edible oil) and then is formed into an oil-in-water type emulsion in an aqueous solution containing milk solids. After pasteurizing the emulsion, a starter is added to the emulsion for fermentation. Subsequently after acid formation, following the procedures of conventional methods for producing natural cheese, i.e., coagulation by rennet (including microorganism rennet), cutting, cooking, pressing, salting and aging, the cheese-like food of the present invention is obtained. Food additives such as emulsifiers, coloring agents, perfumes, seasonings or the like may be added at an appropriate stage of the said process.

Further detailed description of the invention

The process according to the presennt invention comprises the following three steps, (1) the step of interesterification, (2) the step of preparation of emulsion and (3) the step of fermentation and the like.

In the following, each step will precisely be explained.

1. The step of interesterification

This step comprises introducing into triglycerides of natural animal and/or vegetable oils and fats fatty acid radicals derived from an ester of caproic acid or a mixture of caproic acid ester with $C_8$, $C_{10}$ and/or $C_{12}$ fatty acid esters. The interesterification may be carried out by any conventional method.

The ester of caproic acid may be triglyceride thereof; methyl-, ethyl-, propyl- or butyl ester thereof; or diesters thereof with ethyl-, propyl-, or butyl diol; and the like.

The natural animal and/or vegetable oils and fats which may be used as raw materials in the present invention may include tallow, lard, palm oil, palmkernel oil, coconut oil, soybean oil, cottonseed oil, rape seed oil, fractionated oils thereof, hardened oils thereof, hardened oil of fish or whale oil, and the like. Among these oils and fats, animal fats such as tallow, lard, fractionated oils thereof, hardened oils thereof, and hardened oil of fish or whale oil may preferably be used. The most preferable oil and fat is tallow, fractionated oil thereof or hardened oil thereof.

The caproic acid ester and the natural animal and/or vegetable oils and fats as described above are mixed together and heated to effect interesterification. The oils and fats become in a liquid state under heating, whereby the reaction may greatly be accelerated. In said interesterification, a catalyst well-known in the prior art may preferably be used.

In the above interesterification, caprylic acid ($C_8$) capric acid ($C_{10}$) and/or lauric acid ($C_{12}$) may also be added in the form of similar esters as described above. By the addition of these $C_8$, $C_{10}$ and $C_{12}$ components, organoleptic property of the final product is enhanced.

In the synthetic fat after the interesterification and refining have been completed, caproic acid ($C_6$) may be contained in an amount of from 1 to 20 wt. percent, preferably, from 2 to 15 wt. percent. If the $C_6$ component is less than 1 wt. percent no cheese-like flavor is obtained. On the other hand, if it is more than 20 wt. percent, the flavor obtained become different from that of cheese. In the case where other fatty acid components are contained, their amounts may vary widely, but the preferred ranges of the amount of $C_8$, $C_{10}$ and $C_{12}$ components are from 0.5 to 10 wt. percent, from 0.5 to 10 wt. percent and from 0.5 to 10 wt. percent, respectively. But it is required that lauric acid should be contained in an amount not more than 10 wt. percent, since the presence of lauric acid over said limit makes the final product soapy.

The groups of lower fatty acid esters which can be adopted in the present invention are mainly those which are obtained by esterification. On the other hand, the source for the higher fatty acids in the synthetic fat in the present invention depends on natural animal or vegetable oils and fats. The synthetic fat, which is obtained by interesterification between the lower fatty acid esters and the natural animal and/or vegetable oils and fats, has a specific functional structure wherein lower and higher fatty acid radicals are randomly arranged. Therefore, the synthetic fat may also include a synthetic fat having the fatty acid composition and the specific random fatty acid structure of the present invention which is produced by direct esterification of each fatty acid with glycerine.

2. The step for preparing emulsion

The synthetic fat obtained in the above interesterification is refined. It may further be compounded with natural oils and fats such as coconut oil or palmkernel oil. The present step comprises the said refined synthetic fat with an aqueous solution containing milk solids to form an oil-in-water type emulsion.

The milk solid herein used may be any of milk solids obtained from the milk of mammals, also including the form of defatted milk solid or adjusted milk solid (wherein are added proteins from raw materials other than milk).

The preparation of emulsion comprises homogenizing an aqueous solution containing milk solids with the synthetic fat in the presence of, if desired, emulsifiers by using a homogenizing machine such as a homomixer, a homogenizer or the like.

In the emulsion, milk solids need to be contained in an amount of from 1 to 15 wt. percent. The milk solid content in the emulsion may suitably be selected according to the content of oil and fat and the type of cheese-like food to be obtained. If the milk solid content is less than 1 wt. percent, brewing of flavor in cheese becomes insufficient and the body obtained thereby is not satisfactory as a cheese-like food. On the contrary, if it exceeds 15wt. percent, curd-forming property and processability such as removal of whey or the like become deteriorated.

Accordingly, the emulsion before addition of a starter has generally the following composition:

| | Parts in 100 parts of emulsion |
|---|---|
| Milk solid | 1 to 15 |
| Oil and fat | 1.5 to 19 |
| Water | 80 to 97.5 |

The concentration of the synthetic oil and fat may be adjusted to that of cheese-making procedure. Alternatively, higher concentration cream may be prepared, so that it may be used diluted with defatted milk or the like to a desired concentration at the time of cheese-making procedure. In the latter, the desired concentration may usually be obtained by an agitation by means of a homo-mixer.

The emulsifiers herein used may be any of emulsifiers generally used for food, including lecithin, fatty acid monoglyceride, sorbitane fatty acid ester, sugar ester, polyglycerol fatty acid ester, maleic acid monoglyceride, poloxy-ethylene-sorbitane fatty acid ester, and the like. They are added to the emulsion in an amount of from 0.2 to 3.0 wt. percent.

3. The step of fermentation and other steps

Subsequently after the step (2), the emulsion is fermented by adding thereto a starter according to the conventional cheese-making procedures to obtain a fermented food having substantial properties and flavor similar to those of various types of cheese such as Cheddar cheese, Romano cheese, Parmezan cheese or the like. In said fermentation, any conventional starter may be used. Aging may be conducted about from 3 to 6 months to obtain a cheese-like food having a peculiar light flavor of cheese. The characteristics of flavor may be varied by varying the species of starter or the conditions of aging. Furthermore, in addition to the conventional methods for brewing flavor of natural cheese as described above, the cheese-like food of the present invention may possess further characteristics of flavor by varying the proportions of the constituent caproic acid and other fatty acids in the synthetic fat.

The cheese-like food of the present invention contains a small amount of cholesterol as much as 0.1 wt. percent or less. Hence, accumulation of cholesterol in human bodies is less as compared with in case of natural cheese obtained from milk fat which contains larger amount of cholesterol as much as 0.25 to 0.5 wt. percent. The result of AOM stability test carried out for the cheese-like food of the present invention showed that it is extremely resistant to oxidation, which may be ascribed to the addition of $C_6$ to $C_{12}$ components. Further characteristics of the cheese-like food of the present invention is that it shows a peculiar change of physical state according to the change of temperature. That is, it is comparatively soft at a lower temperature around 5°C and posseses excellent quality of form maintenance at a higher temperature around 30°C. This is entirely different from natural cheese which is soft at a higher temperature around 30°C and becomes hardened at a lower temperature around 5°C. This effect may be considered due to the redistribution of fatty acid radicals among the synthetic fat. By the use of thus obtained fermented food, other foods such as process cheese or cakes can also be produced.

The present inventors have made judgement about the quality of the fermented food produced by the procedure, according to an organoleptic test conducted by a panel of trained and experienced testing members.

The present invention will now be further explained by referring to the following Examples, wherein all 'parts' and 'percent' signify 'parts by weight,' and 'percent by weight,' respectively.

EXAMPLES 1 - 20

I. Preparation of synthetic oil and fat

Various kinds of synthetic oils and fats having the composition within the scope of the present invention together with those outside said scope were prepared. In the Examples from No. 1 to No. 19, interesterification was conducted at 60°C. for one hour in the presence of 0.5 part of sodium methylate. The catalyst was removed by means of filtration and thereafter decoloration of the products was effected at 110°C. for 10 minutes by adding one part of activated clay. Subsequently, deodorization was carried out by way of reduced pressure distillation at 240°C. for 1 hour. The synthetic fat of Example 20 was prepared for a comparative purpose. In this comparative example, the product was obtained by merely blending, in place of effecting interesterification, the refined raw oils and fats (each triglyceride of $C_6$, $C_8$, $C_{10}$ and $C_{12}$ was refined only by the deodorizing distillation and tallow was refined according to the same refining procedure as just described above). The compositions of raw materials for Examples 1 - 20 are listed in Table 1. The compositions of Examples 1 - 20 after refining were determined by analysis and are shown in Table 2. Example No. 5, No. 9 and No. 15 have the composition outside the scope of the present invention.

Table 1

| Example No. | $C_6$ Trigly- ceride | $C_6$ Butyl ester | Ethyl- diol ester | $C_8$ Trigly- ceride | Ethyl ester | $C_{10}$ Trigly- ceride | $C_{12}$ Trigly- ceride | Coconut oil | Palm oil | Hardened solybean coil (m.p.=32°C.) | Tallow |
|---|---|---|---|---|---|---|---|---|---|---|---|
| 1 | 6 | — | — | — | — | — | — | 5 | — | — | 89 |
| 2 | — | — | 8 | 2 | — | 2 | — | — | 30 | — | 58 |
| 3 | 7 | — | — | 3 | — | — | — | 5 | — | 35 | 50 |
| 4 | 7 | — | — | — | — | — | — | — | — | — | 93 |
| 5 | 0.6 | — | — | 7 | — | 2.3 | 4.1 | — | — | — | 86 |
| 6 | — | 2.4 | — | 5.7 | — | 2.3 | 3.6 | — | — | — | 86 |
| 7 | 25 | — | — | — | — | — | — | 5 | — | — | 70 |
| 8 | 21 | — | — | — | — | — | — | 5 | 24 | 50 | — |
| 9 | 28 | — | — | — | — | — | — | 5 | 17 | 50 | — |
| 10 | 3.5 | — | — | — | 5.0 | — | — | — | 30 | — | 61.5 |
| 11 | — | 6.0 | — | — | — | 2.5 | — | — | — | — | 91.5 |
| 12 | 6.5 | — | — | 9.0 | — | — | — | — | — | — | 84.5 |
| 13 | 6.5 | — | — | 7.5 | — | — | — | — | — | — | 86.0 |
| 14 | 6.5 | — | — | 5.0 | — | 4.5 | — | — | — | — | 84.0 |
| 15 | 6.5 | — | — | 5.0 | — | 6.5 | — | — | 30 | — | 52.0 |
| 16 | 6.5 | — | — | — | — | — | — | 28 | — | — | 65.5 |
| 17 | 6.5 | — | — | 5.0 | — | 2.5 | 0.6 | — | — | — | 85.4 |
| 18 | 6.5 | — | — | 5.0 | — | 2.5 | 0.1 | — | — | — | 85.9 |
| 19 | 6.5 | — | — | 4.3 | — | 1.5 | — | 13 | — | — | 74.7 |
| 20 | 6.2 | — | — | 5.2 | — | 2.5 | 6.1 | — | — | — | 80.0 |

Table 2

| Example No. | $C_6$ | $C_8$ | $C_{10}$ | $C_{12}$ | (weight %) | Remarks |
|---|---|---|---|---|---|---|
| 1 | 5.6 | 0.2 | 0.4 | 2.3 | | |
| 2 | 6.0 | 2.1 | 2.3 | 2.3 | | |
| 3 | 6.5 | 2.7 | 0.4 | 2.3 | | |
| 4 | 6.5 | 0.1 | 0.1 | 0.1 | | |
| 5 | 0.5 | 6.2 | 2.0 | 4.0 | | outside the scope of the present invention |
| 6 | 1.1 | 5.0 | 2.0 | 3.5 | | |
| 7 | 19.7 | 0.3 | 0.5 | 2.5 | | |

Table 2 — Continued

| Example No. | $C_6$ | $C_8$ | $C_{10}$ | $C_{12}$ (weight %) | Remarks |
|---|---|---|---|---|---|
| 8 | 17.0 | 0.3 | 0.5 | 2.5 | |
| 9 | 22.0 | 0.4 | 0.6 | 2.6 | outside the scope of the present invention |
| 10 | 3.2 | 3.8 | 0.1 | trace | |
| 11 | 3.1 | 0.0 | 2.6 | trace | |
| 12 | 6.0 | 8.8 | 0.3 | trace | |
| 13 | 6.1 | 7.0 | 0.2 | trace | |
| 14 | 6.1 | 4.7 | 4.1 | trace | |
| 15 | 5.9 | 4.8 | 6.0 | trace | |
| 16 | 5.8 | 1.2 | 2.2 | 12.9 | outside the scope of the present invention |
| 17 | 6.1 | 4.8 | 2.3 | 0.5 | |
| 18 | 6.0 | 4.8 | 2.3 | 0.2 | |
| 19 | 6.1 | 4.7 | 2.2 | 6.0 | |
| 20 | 6.0 | 5.0 | 2.4 | 6.0 | without interesterification and outside the scope of the present invention |

II. Preparation of cheese-like food

Five parts of each synthetic fat obtained in the Examples No. 1 - No. 20, 95 parts (calculated as milk solids) of skim milk (9.0 weight percent aqueous solution), 0.2 part of sorbitane esters of stearic acid and 0.3 part of lecithin were mixed together. While stirring the mixture, pasteurization was carried out by heating the mixture at 70°C for 30 minutes. The mixture was then homogenized by means of a Homogenizer under 40 Kg/cm² to form an oil-in-water type emulsion. After this emulsion was cooled to 45°C., 0.6 percent of starter (Streptococcus lactis) was added thereto. Fermentation was continued until the acidity of each emulsion became 0.5 percent. Then, rennet was added to the emulsion at 30°C in an amount of 0.004 percent based on emulsion and the emulsion was left to stand for 60 minutes to effect curd formation. Subsequently, conventional cutting, cooking, pressing and salting of prior art were applied to the product and thereafter aging was conducted for 3 months. Organoleptic test by 20 members of panel was carried out for each cheese-like food thus obtained. The value of the Cheddar cheese (3 month's product) obtained from milk was determined as 10. The results are shown in Table 3, wherein the value of 7 is considered as a standard mark.

Example 21

70 Parts of skim milk were warmed to 70°C and separately 30 parts of the synthetic fat obtained in Example 3 were melted by heating at 70°C. After 0.4 part of sorbitane monopalmitate and 0.4 part of sugar ester (Nitto ester S—1005 R.M.) were dissolved into the melted fat, both the skim milk and the said oil and fat were thrown into water while agitating the mixture. After agitation was continued for 15 minutes, the mixture was homogenized by a Homogenizer under a pressure of 80 Kg/cm² to form an oil-in-water type emulsion.

17 Parts of this mixture and 83 parts of skimmed milk were mixed by stirring to prepare a homogeneous mixture. According to the same procedure as described in Examples 1 - 20, cheese-like food was produced from this mixture. After 3 month's ageing, there was obtained an excellent cheese-like food whose values of flavor and organoleptic property are 9.7 and 9.5, respectively, according to the organoleptic test by 20 members of panel.

Example 22

95 Parts of the synthetic fat obtained in Example 14 and 5 parts of coconut oil were mixed together to pre- Table 3

| Example No. | Flavor | Organoleptic property | Remarks |
|---|---|---|---|
| Cheddar cheese | 10 | 10 | |
| 1 | 10 | 10 | flavor preferred by those who like light flavor (like a cream) |
| 2 | 11 | 10 | preferable flavor slightly thicker than that of reference |
| 3 | 11.1 | 10 | preferable flavor, having a thick taste like that of Italian cheese |
| 4 | 8.7 | 9.8 | a cheese odor with slightly cream-like flavor (like cottage cheese |
| 5 | 6.5 | 10 | having no cheese-like flavor |
| 6 | 8.5 | 10 | little cheese-like flavor but with a fruit-like fragrance |
| 7 | 8.7 | 8.7 | slightly stimulating cheese-like flavor |
| 8 | 9.0 | 9.0 | slightly stimulating cheese-like flavor which is more preferable than that of Example 7 |
| 9 | 6.0 | 7.5 | a soft structure and stimulating flavor |
| 10 | 9.0 | 9.8 | cheese-like flavor mixed slightly with a fruit-like flavor |
| 11 | 8.8 | 9.5 | slightly light cheese-like flavor |
| 12 | 8.0 | 9.0 | balance of flavor is slightly bad |
| 13 | 9.0 | 9.5 | not well-balanced cheese-like flavor which is more preferable than that of Example 12 |
| 14 | 9.2 | 9.7 | soft cheese-like flavor |
| 15 | 7.8 | 9.6 | balance of flavor is slightly bad (having bitterness) |
| 16 | 4.5 | — | unpleasant soapy flavor |
| 17 | 10.3 | 10.0 | excellent flavor (like an Italian cheese having a fruit like flavor) |
| 18 | 9.5 | 9.7 | soft cheese-like flavor (resembling well that of Example 14) |
| 19 | 11.3 | 10.0 | particularly preferable cheese-like flavor (thicker than that of Example 3) |
| 20 | 4.0 | 6.5 | unpleasant odor, strong bitterness and not suitable for foods | pare an adjusted fat. By the use of this fat, a cheese-like food was produced according to the same procedure as described in Examples 1 – 20. After 3 month's ageing, an excellent cheese-like food was obtained. The result of organoleptic test by 20 memters of panel showed that the average values of flavor and organoleptic property were 9.7 and 9.5, respectively.

Example 23

Example 22 was repeated except that 5 parts of palmkernel oil was used in place of coconut oil. After three month's ageing, an excellent cheese-like food was produced. The average values of flavor and organoleptic property evaluated by 20 members of organoleptic panel test were 9.6 and 9.5, respectively.

We claim:

1. A process for producing a cheese-like food, which comprises:
    1. effecting interesterification by mixing mono-lower alcoholic, glycolic or glycerine esters of caproic acid, caprylic acid, capric acid and lauric acid with natural oils and fats, and then refining the esterification product to prepare a synthetic fat without a $C_4$ fatty acid component and containing from 1 to 20 percent by weight of caproic acid, from 0.5 to 10 percent by weight of caprylic acid, from 0.5 to 10 percent by weight of capric acid and from 0.5 to 10 percent by weight of lauric acid, calculated as acid, based on the total weight of the synthetic fat, respectively,
    2. mixing homogeneously said synthetic fat with an aqueous solution containing milk solids to form an oil-in-water type emulsion, and
    3. adding a starter to said emulsion for fermentation, followed further by a cheese-making procedure including coagulation by rennet, cutting, cooking, pressing, salting and aging of the fermented product.
2. The process according to claim 1, wherein the content of milk solids in said emulsion is from 1 to 15 parts per 100 parts of emulsion and the content of oil and fat is from 1.5 to 19 parts per 100 parts of emulsion.
3. The process according to claim 1 wherein the amount of caproic acid is controlled to from 2 to 15 weight percent.
4. The process according to claim 1, wherein soybean oil, coconut oil, palmkernel oil, cotton seed oil, rape seed oil, palm oil or hardened oils thereof are used as raw vegetable oil.
5. The process according to claim 4, wherein fish oil, whale oil, tallow, lard and/or hydrogenated oils thereof are used as raw animal fat.
6. The process according to claim 1, wherein skimmed milk solids are used.
7. The process according to claim 1, wherein the interesterification is carried out under heating in the presence of a catalyst.
8. The process according to claim 1, wherein the emulsion is formed in the presence of emulsifiers used for food selected from the group consisting of lecithin, fatty acid monoglyceride, sorbitane fatty acid ester, sugar ester, polyglycerol fatty acid ester, malic acid monoglyceride, and polyoxyethylene sorbitane fatty acid ester.
9. The process according to claim 1, wherein an emulsion having higher concentration of the oil and fat is prepared so that it may be used after dilution with an aqueous solution containing milk solids at the time of the cheese-making procedure.
10. The process according to claim 1, wherein, prior to the preparation of the emulsion, the synthetic fat is compounded with natural vegetable oils.
11. The process according to claim 10, wherein coconut oil and/or palmkernel oil are used as natural vegetable oils.
12. The cheese-like food prepared according to the process of claim 1.

* * * * *